Nov. 6, 1962     W. J. BROWN     3,062,999

THERMAL REGULATING SYSTEM

Original Filed April 7, 1950     3 Sheets-Sheet 1

INVENTOR
Walter J. Brown

BY Connolly and Hutz

ATTORNEYS

Nov. 6, 1962 W. J. BROWN 3,062,999
THERMAL REGULATING SYSTEM
Original Filed April 7, 1950 3 Sheets-Sheet 2

INVENTOR
Walter J. Brown
BY Connolly and Hutz
ATTORNEYS

Nov. 6, 1962 W. J. BROWN 3,062,999
THERMAL REGULATING SYSTEM
Original Filed April 7, 1950 3 Sheets-Sheet 3

INVENTOR
Walter J. Brown
BY Connolly and Hutz
ATTORNEYS

United States Patent Office 3,062,999
Patented Nov. 6, 1962

3,062,999
THERMAL REGULATING SYSTEM
Walter J. Brown, Stamford, Conn., assignor to Vectrol Engineering Inc., Stamford, Conn., a corporation of Delaware
Original application Apr. 7, 1950, Ser. No. 154,547, now Patent No. 2,842,345, dated July 8, 1958. Divided and this application Apr. 30, 1958, Ser. No. 732,069
7 Claims. (Cl. 320—35)

This application is a division of my co-pending application Serial No. 154,547, filed on April 7, 1950, entitled Thermal Regulating System, now U.S. Patent 2,842,345.

This invention relates to thermal regulating or heat governing systems for controlling the operation of heating and/or cooling equipment of any kind, such, for example, as equipment for heating and/or cooling buildings, vehicles, incubators, constant temperature baths, air-conditioning equipment, refrigerators, water heaters and other household appliances, such as, ironers, irons, clothes driers, ovens, furnaces, industrial processing heaters and also heating and/or cooling equipment of the heat pump type.

One object of the invention is to provide a thermal regulating system which is controlled by the variation of dielectric constant with temperature of certain materials, such as Rochelle salt, barium or strontium titanate and mixtures or compounds thereof, which will be referred to for convenience as "temperature-sensitive dielectrics."

Another object of the invention is to provide a thermal regulator comprising a capacitor incorporating a temperature-sensitive dielectric having a Curie point, at which a maximum dielectric constant occurs, in the neighborhood of a temperature which it is desired to control.

Another object of the invention is to provide a thermal regulating system controlled by a resonant circuit including a capacitor having a temperature-sensitive dielectric.

Another object of the invention is to provide a thermal regulating system which provides continuous control or modulation of the flow of heat by the variation in a capacitance which incorporates a temperature-sensitive dielectric.

Another object of the invention is to provide such continuous control by means of an electric power controller or converter, the output of which is continuously controlled by the variation in a capacitance incorporating a temperature-sensitive dielectric. A further object is to control such converter by means of a phase-shifting network which includes a capacitor incorporating a temperature-sensitive dielectric.

A further object of the invention is to provide continuous control of the flow of heat by means of an electric space discharge device, the output of which is controlled by a capacitor having a temperature-sensitive dielectric, said capacitor preferably forming part of a phase-shifting network.

A further object of the invention is to provide means for adjusting the controlling temperature by adjustment of an independent electrical constant, such as an inductance, capacitance, resistance or a voltage, current or a phase angle in the electrical control circuit.

A further object of the invention is to provide means for adjusting the controlled temperature by means of an adjustable heater mounted adjacent the temperature-sensitive dielectric so as to establish a predetermined difference between the temperatures of the dielectric and of its surroundings.

A further object of the invention is to use a temperature sensitive dielectric in a system as above described such that the Curie point is just above the temperature which it is desired to maintain, whereby decrease in temperature will decrease the capacitance (and vice versa) and will thus advance the output phase angle of a phase-shifting network and so increase the output of the converter controlling a heating system, and especially to select Rochelle salt or a barium-strontium titanate of approximately 80:20 ratio as a suitable material for the control of room heating.

A further object of the invention is to select a temperature-sensitive dielectric material such that the Curie point is just below the temperature which it is desired to maintain in a cooling system, whereby increase in temperature will decrease the capacitance (and vice versa) and will thus advance the output phase angle of a phase-shifting network and so increase the output of the converter controlling the cooling system, and especially to select Rochelle salt or a barium-strontium titanate having approximately a 70:30 ratio as a suitable material for the control of room cooling.

A further object of the invention is to provide a combined heating and cooling system, controlled by a capacitor having a temperature-sensitive dielectric with its Curie point at the desired temperature, whereby the output of the converter is increased when the temperature departs either upwards or downwards from the desired temperature, thus increasing the rate of heat transfer, together with thermostatically controlled switching means to reverse the flow of heat at the Curie point so as to provide a heating system below the Curie point and a cooling system above the Curie point.

A further object of the invention is to control heating and/or cooling equipment in accordance with the approximate average of the temperatures at several points, by providing a capacitor with a temperature-sensitive dielectric at each point and electrically connecting them to the same control system. Such capacitors may be installed at various points within a building, or alternatively one or more such capacitors may be installed outside the building to anticipate and compensate for changes in outdoor temperature.

A further object of the invention is to provide a system of continuous control of the fuel or other power input to a heating or cooling system by temperature-senstive dielectric means.

A further object of the invention is to provide a system of continuous control, by temperature-sensitive dielectric means, of the transfer of heat from or to a heat-exchanging medium which is heated or cooled by other means.

A further object of the invention is to provide a system of continuous control of the transfer of heat from or to a heat exchanging medium by temperature-sensitive dielectric means, together with a system of intermittent control of the fuel or other power input to provide the heating or cooling for said medium.

A further object of the invention is to provide a temperature-sensitive electrical phase-shifting network including a capacitor having a temperature-sensitive dielectric.

A further object of the invention is to provide a control system for alternative temperature ranges by means of a plurality of temperature-sensitive capacitors having different Curie points, and a switch for selecting same.

A further object of the invention is to provide a temperature-limiting device for an electrolytic cell such as a storage battery in which the electrical input power is continuously controlled to limit maximum temperature in the cell.

A further object of the invention is to control the high frequency output of an electric power converter supplying power to an induction or dielectric heating device, or to an ultrasonic energy device, whereby the maximum temperature of a body or fluid under treatment is continuously controlled.

Other objects and a fuller understanding of the invention may be had by referring to the following description and claims, taken in conjunction with the accompanying drawings, in which:

Figure 1:
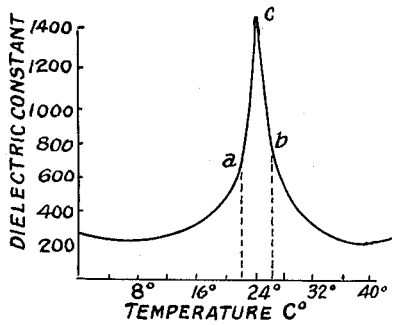
FIGURE 1 is a graph plotting dielectric constant versus temperature for a temperature-sensitive dielectric.

FIGURE 1 shows the relation between the initial free dielectric constant $k'_0$ of Rochelle salt and temperature, at a low field strength, as illustrated by W. G. Cady in Piezoelectricity. McGraw-Hill, 1946, on page 557, Fig. 119. The curve exhibits a sharp maximum of dielectric constant at a temperature of 24 degrees centigrade, which is generally referred to as a Curie point, indicated by the letter c in FIGURE 1. I draw attention to the fact that this Curie point occurs at a convenient room temperature of 24 degrees centigrade or approximately 75.2 degrees Fahrenheit, and that the dielectric constant falls away very rapidly indeed for the first 5 degrees centigrade or 9 degrees Fahrenheit below and above the Curie point. Accordingly, I conveniently control the heating of a room during the winter and/or the cooling of a room during the summer by means of a thermal regulator comprising a capacitor having Rochelle salt as its dielectric, in conjunction with other elements to be described.

I control the heating of a room during winter by means to be described with starts the flow of heat into the room as the temperature falls to a predetermined value below 24 degrees centigrade, and continuously increases the flow as the temperature falls still further, so that the room temperature becomes stabilized at a temperature such, for example, as 22 degrees centigrade (71.6 degrees Fahrenheit) as illustrated by a point "a" in FIGURE 1. Alternatively, I control the cooling of a room during the summer by starting the flow of heat out of the room as the temperature rises to a predetermined value above 24 degrees centigrade and continuously increaess the flow as the temperature rises still further so that the room temperature is stabilized at a temperature such, for example, as 26 degrees centigrade (78.8 degrees Fahrenheit) as illustrated by point "b" in FIGURE 1.

The temperatures hereinbefore specified are the temperatures of the dielectric of the Rochelle salt capacitor itself and, if it is desired to stabilize the room temperature at a lower value, I may provide a small heater adjacent to said condenser which will raise its temperature by the required amount above the ambient temperature in the room, thus depressing the room temperature by the same amount.

However, it is frequently desirable to provide for a wider range of temperature control, and I may do this by using an alternative material as the dielectric of my capacitor. It is necessary, in order to have a sensitive temperature controlling system, to choose a material having a rapid variation of dielectric constant over the desired temperature range. For the purpose of this application, I will define a dielectric material of which the dielectric constant, otherwise known as the permittivity, varies with temperature, as a "temperature-sensitive dielectric," and I will define a capacitor having such a dielectric as a "temperature-sensitive-capacitor."

Figure 2:
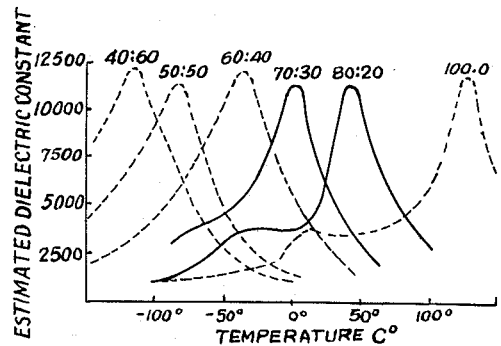
FIGURE 2 shows a family of similar graphs for a different dielectric material.

FIGURE 2 shows the relation between the dielectric constant and the temperature for a series of materials known as the "barium-strontium titanate series," as illustrated by Prof. Willis Jackson in "The Journal of the Institution of Electrical Enginners" (London), vol. 94, Part III, No. 27, January 1947, page 9, Figure 5. It will be seen that the Curie point depends upon the relative barium-strontium ratio, and I may accordingly choose a material from this series—or a material having some intermediate ratio—to suit the particular application.

For instance, for the control of room heating, I may choose a barium-strontium titanate having a Curie point at 40 degrees centigrade, corresponding to a barium-strontium titanate ratio of approximately 80:20, in conjunction with other equipment to be described, which increases the flow of heat into the room as the temperature falls below the Curie point, so as to stabilize the temperature at any desired value between 35 degrees and 20 degrees centigrade. For the control of room cooling I may choose a barium-strontium titanate having a Curie point of 10 degrees centigrade, corresponding to a ratio of approximately 70:30, in conjunction with equipment to increase the flow of heat out of the room as the temperature rises above the Curie point, so as to stabilize the temperature at any desired value between 20 degrees and 35 degrees centigrade.

In all the arrangements so far described, it has been assumed that equipment is provided, as described hereinafter, which increases the flow of heat as the temperature moves away from the Curie point, whether for heating or for cooling, and I will arbitrarily define this as "normal" control.

It is, however, possible to reverse the sense of the control by providing equipment which I have defined as having "inverted" control, and which will be described hereinafter. In such an "inverted" control system, the flow of heat is continuously decreased as the temperature moves away from the Curie point. For a heating system with inverted control, I would choose, for example, a 70:30 barium-strontium titanate, and since the flow of heat is continuously decreased as the temperature rises above the Curie point, the temperature may be stabilized at any desired value between 20 degrees and 40 degrees centigrade. For a cooling system with inverted control, I might use an 80:20 barium-strontium titanate and I may stabilize the temperature at any desired value between 35 degrees and 20 degrees centigrade.

While I have referred to the flow of heat as being "continuously variable," I do not intend that it should be continuously variable over the whole of the wide ranges of temperature specified above, but only over a desired part of such range. For instance, in a heating system with "inverted control" as hereinbefore described, and assuming a desired temperature of 25 degrees centigrade, I would arrange for the maximum possible rate of heat flow from 10 degrees centigrade to say 24 degrees centigrade, followed by a continuous decrease in heat flow from 24 degrees to 26 degrees centigrade, followed by zero or substantially zero heat flow at higher temperatures. In this way I may maintain a substantially constant temperature of 25 degrees plus or minus 1 degree centigrade; I have constructed equipment which will regulate the temperature even more closely than this.

Figure 3:
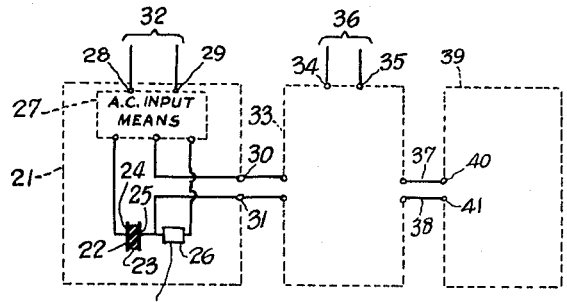
FIGURE 3 is a generic block diagram of a thermal regulating system.

FIGURE 3 illustrates my invention in a generic form, and various elements of a thermal regulating system are shown in the form of a block diagram. The block designated 21 is a thermal regulator comprising a capacitor 22 which will be referred to hereinafter as a temperature-sensitive capacitor since it comprises a temperature-sensitive dielectric 23 and conductive electrodes 24 and 25; the dielectric 23 may comprise Rochelle salt or barium or strontium titanate, or a mixture or compound of barium or strontrium titanate, or any other dielectric which exhibits a rapid change of dielectric constant as the temperature is varied above and/or below a desired value.

The most suitable materials are those which are frequently known as ferro-electric materials, which include Rochelle salt and the titanates hereinbefore mentioned, since these are characterized by a sharp maximum of dielectric constant at a particular temperature usually referred to as a Curie point.

The temperature-sensitive capacitor 22 is connected to an impedance 26 and the capacitor-impedance circuit so formed is connected to alternating current input means 27 which are provided with terminals 28 and 29 for connection to a source of alternating current 32. Connections are also provided from the alternating current input means and the capacitor-impedance circuit 22—26 to conductors 30 and 31 which form the output conductors of the thermal regulator 21. The thermal regulator 21 may conveniently take the form of a phase-shifting network having the temperature-sensitive capacitor 22 as a variable phase-controlling element therein. Alternatively, the thermal regulator 21 may comprise an alternating current network having capacitor 22 as an amplitude-controlling element therein.

An electric power controller 33 is provided with input terminals 34 and 35 for connection to a source of power 36 which may conveniently be identical with the alternating current source 32. The flow of electric power through the electric power controller 33 is controlled in a continuously variable manner by the output of the thermal regulator 21 by connections 30 and 31 and the electric power so controlled is supplied to the electric power controller output conductors 37 and 38. The electric power controller may conveniently take the form of a rectifier comprising one or more space discharge devices such as "thyratrons" or mercury arc retifiers provided with control electrodes, the output of which is continuously variable by varying the phase angle of an alternating current voltage applied to said control electrodes, or by varying a rectified alternating current voltage which is applied to said electrodes preferably in conjunction with an alternating current voltage which is phase-displaced in relation to the anode voltage of said rectifier.

The block 39 in FIGURE 3 represents a heat energy controller, which may comprise any device or system in which heat is generated and/or absorbed, transferred or exchanged at a rate which is progressively gradually controllable by the continuously variable electrical input which is applied to its terminals 40 and 41 from the electric power controller 33 through conductors 37 and 38. It may comprise any of the known electrically operated devices for controlling the flow of a fuel and/or of the air required for its combustion, or alternatively of a heat-containing or heat-exchanging medium such as a hot or cold fluid.

It may comprise, for example, an electrically driven fan or pump for circulating a heat-containing or heat-exchanging fluid or a fluid fuel, or an electrically driven stoker for a solid fuel, preferably, though not necessarily of a variable speed type driven, for example, by a direct current or universal motor.

Alternatively, the heat energy controller 39 may comprise an electrically controlled valve or damper for a heat-containing or heat-exchanging fluid or a fluid fuel or for the air required for the combustion of a fuel; preferably, such valve or damper is of the continuously adjustable type. Alternatively, the heat energy controller 39 may comprise a device in which heat is created from an electrical input, for instance, by means of a heating resistor connected to terminals 40 and 41, or by means of a motor-driven heat pump such as a compressor, for a refrigerator or for a reverse cycle heating system, or alternatively by means of an induction or dielectric heating device in which event the electrical input is supplied to terminals 40 and 41 at a suitable alternating current frequency.

The heat energy controller may alternatively take the form of a device in which heat is created, sometimes as an unwanted by-product, the amount of which it is desired to limit, such for instance as a storage battery of which 40 and 41 represent the charging terminals, or an ultrasonic transducer device, taking a high frequency electrical energy input at its terminals 40 and 41 and converting such electrical energy into wanted ultrasonic energy and unwanted heat energy. In any of the aforesaid arrangements, the temperature-sensitive capacitor 22 is associated with the heat energy controller 39 so that its temperature is dependent upon the heat flow produced by said heat energy controller. This is not shown in FIGURE 3, however, it is so shown in FIGURES 7, 11, 12 and 13.

Figure 4:
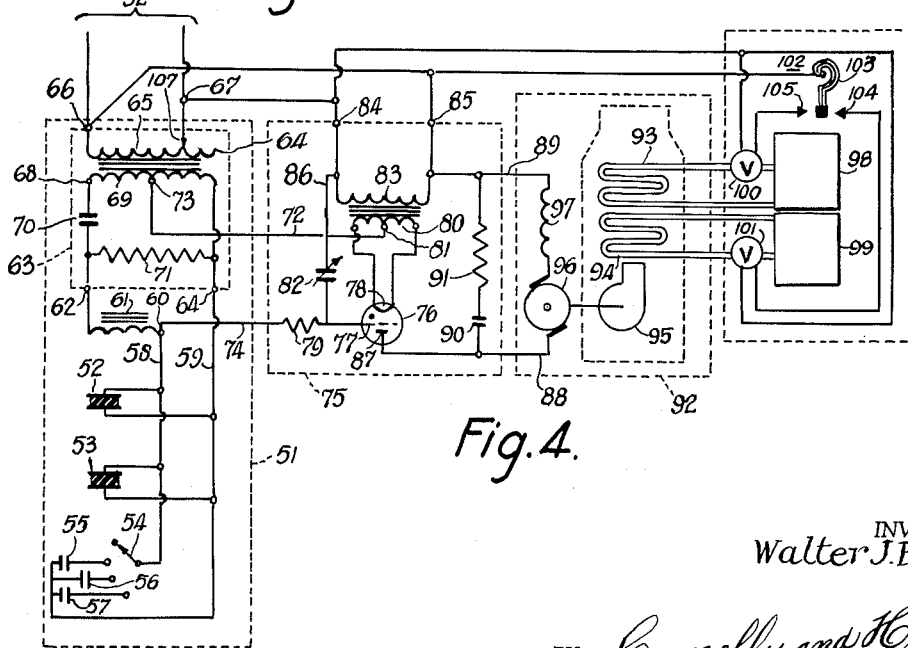
FIGURE 4 is a specific form of a heat governing system, particularly adapted for room heating and/or cooling.

FIGURE 4 illustrates a specific form of my invention. The thermal regulator 51 includes a plurality of temperature-sensitive capacitors 52 and 53 connected in parallel with each other and a switch 54 is provided so that any one of the fixed capacitors 55, 56, 57 may also be connected in parallel with the temperature-sensitive capacitor if desired. The temperature-sensitive capacitors may be mounted in any desired position in the space or fluid or body of which it is desired to control the temperature, and the fixed capacitor group may be mounted in any position from which it is convenient to control the desired temperature, and all the capacitors may be connected in parallel through conductors 58, 59 which may be of any desired length providing the capacity between said conductors is not high in comparison with that of said capacitors. Conductor 58 is connected to a terminal 60 of a reactor 61, the other terminal 62 of which is connected to an alternating current input means 63. Conductor 59 is connected to another terminal 64 of the alternating current input means 63. The alternating current input means 63 comprises a transformer having its primary 65 connected to input terminals 66 and 67 for connection to an alternating current source 32. Across the end terminals 68, 64 of the transformer secondary 69 there are connected a capacitor 70 and a resistor 71 in series with each other and with terminal 62 therebetween. An output conductor 72 is connected to an intermediate tap 73 on transformer secondary 69, and a second output conductor 74 is connected to terminal 60.

The thermal regulator as hereinbefore described for use in this embodiment of my invention has the electrical characteristics of a sensitive phase-shifting network of the type described in my copending patent application, Serial No. 779,909, filed Oct. 15, 1947, now issued as Patent No. 2,524,762 on October 10, 1950, entitled "Phase Shift Circuit," while having the novel feature that the phase angle of the output voltage is dependent upon the temperatures of the temperature-sensitive capacitors 52 and 53 as well, as upon the selection of a parallel capacitor by means of switch 54. Alternative arrangements of my thermal regulator may be constructed by using the alternative phase shifting networks described in my copending applications, Serial No. 770,968, now Patent No. 2,524,761, entitled "Phase Shift System"; Serial No. 770,966, now Patent No. 2,524,759, entitled "Phase Shift Network"; Serial No. 770,967, now Patent No. 2,524,760, entitled "Phase Shift Bridge"—all of these applications being filed on August 28, 1947, and being issued on October 10, 1950.

Figure 5:
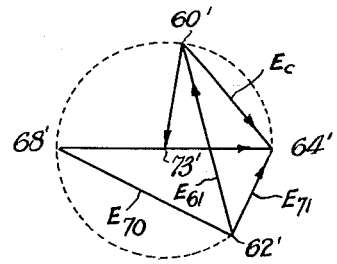
FIGURE 5 is a vector diagram of the voltage vectors obtainable from the thermal regulator incorporated in the system of FIGURE 4.

The configuration of the phase shifting network embodied in FIGURE 4 of the subject application is similar to that shown in FIGURE 5 of patent application, Serial No. 779,909, now U.S. Patent 2,524,762, and its voltage vector diagram is similar to that shown in FIGURE 2 of said patent application, which is reproduced herewith as FIGURE 5. In FIGURE 5, however, the voltage vectors have been renumbered to indicate the voltages appearing across the corresponding elements in the phase-shifting network which is embodied in the thermal regulator shown in FIGURE 4. The transformer secondary 69 establishes a fixed voltage vector 68'—64' having a center point 73' corresponding to the intermediate tap 73. The capacitor 70 and resistor 71 establish fixed vectors $E_{70}$ and $E_{71}$ forming a right-angled triangle 68'—62'—64'. The reactor 61 establishes a vector $E_{61}$ extending from the fixed point 62' to the point 60'. The sum of the capacitors 52, 53 and of any additional capacitor selected by switch 54 establishes a vector $E_c$ extending from point 60' to fixed point 64'. Since the capacitors 52 and 53 are thermally sensitive, any change of temperature will alter the length of vector $E_c$ in relation to the vector $E_{61}$ which represents the reactor voltage, and this will cause the point 60' to travel around an arc as indicated by the dotted line in FIGURE 5. If the "Q" of the sum of the capacitors remains constant during such temperature variation, or if it remains very high in comparison with the "Q" of the reactor, the phase angle between the vectors $E_{61}$ and $E_c$ will remain constant and the arc will be the arc of a circle and it will span the vector 62' and 64' as depicted in FIGURE 5; if the "Q" does not remain constant, the locus of point 60' will lie on an arc which is not circular. In either event, however, the vector 73'—60', which represents the output voltage of the thermal regulator, will rotate about point 73', indicating that the output voltage will vary in phase as the temperature changes. It will be noted that an increase in capacitance due to temperature change will shorten the vector 60'—64' and will accordingly retard the phase of the output voltage 73'—60'. It is also evident that in the more generally known phase-shifting networks of the prior art, an increase in capacitance will retard the phase of the voltage output vector, and I have therefore designated any such phase-shifting network as having a "normal" sense of operation, in contrast to a special phase-shifting network which I shall describe hereunder and which has an "inverse" sense of operation, for reasons to be described later. In my thermal regulator, as shown in FIGURE 4, I may use a plurality of temperature-sensitive condensers 52 and 53 so that the phase angle may be regulated by an approximate average of the temperatures at various points rather than by a single temperature but a single temperature-sensitive condenser may be used for simplicity and economy if desired. Furthermore, I may connect a fixed or variable condenser, such as the group 55, 56, 57 in parallel in order to vary the phase angle at a given temperature and so to vary the temperature at which a given phase angle results; however, this may also be omitted if desired, or alternatively such fixed capacitor may be connected in series with the temperature-sensitive capacitor or capacitors.

The output of my thermal regulator is taken through conductors 72 and 74 to an electric power controller 75 which may take the form of a grid-controlled rectifier tube 76 having a control grid 77 and a cathode 78 to which conductors 74 and 72 are connected, respectively, through a resistor 79 and a filament transformer secondary 80 having a center tap at 81. A capacitor 82 is connected from grid 77 to filament center tap 81 and this may be variable, for the purpose of adjusting the phase angle of the control grid voltage, and therefore adjusting the desired temperature. The primary 83 of the filament transformer is connected to power input terminals 84, 85 which are connected in parallel with the input terminals 67, 66 of thermal regulator 51. Power input terminal 84 is connected through conductor 86 to the filament center tap 81. Anode 87 of tube 76 is connected to a power output conductor 88, and power input terminal 85 is connected directly to power output conductor 89. Accordingly, the tube 76 acts as a rectifier to deliver a unidirectional current output to the conductors 88 and 89, the value of which is dependent upon the phase angle of the voltage applied between the grid 77 and cathode 78 from the thermal regulator 51. It is easily understood that the connections to transformer 65 in the thermal regulator 51 should be made in the correct sense to ensure that, when the output phase angle of the thermal regulator is fully retarded, the voltage applied between grid 77 and cathode 78 is approximately 180 degrees out of phase with the voltage applied between anode 87 and cathode 78. In order to increase the average value of the unidirectional current output, a large capacitor 90 is preferably connected across the output conductors 88 and 89, preferably through a small series resistor 91, the purpose of which is to limit the peak anode current of the tube 76 to a safe value.

A heat energy controller 92 comprises, in this instance, a device for circulating air through heating and cooling coils 93 or 94, either of which may be alternatively energized depending upon whether heating or cooling is required, the rate of circulation being determined by a fan 95 which is driven by a variable speed motor having an armature 96 and a field winding 97, which are serially connected to the power output conductors 88 and 89 of the electric power controller 75.

A source 98 of heat-containing medium at high temperature, such as hot water or steam is provided for heating purposes. Alternatively, a source 99 of heat-containing medium at low temperature, such as a liquid refrigerant is provided. Either one of these sources may be connected to the heat energy controller 92, while the other source is shut off, by means of valves 100 and 101. These valves may conveniently be electrically operated through the medium of a thermostat 102 having a bimetal strip 103 engaging alternative contacts 104 or 105 according to whether the temperature is below or above the desired value. Thermostat 102 should be mounted in convenient relationship to the temperature-sensitive capacitors 52 and 53. Alternatively, if a simpler system is desired, either for heating only or for cooling only, one of the sources 98 or 99, together with its corresponding coil 93 or 94 may be omitted. Even in such cases, however, it may be desirable to retain the thermostat 103 to act as a limit control to cut off the source of heat-containing medium, and/or to cut off the electric power controller in case a limiting hot or cold temperature should be exceeded. The operation of the entire system of FIGURE 4 will now be described for clarity.

In the case where a completely automatic heating and cooling system is required, the temperature-sensitive capacitors 52 and 53 are mounted at representative points in the space or fluid or body which is associated with the heat energy controller and of which it is desired to control the temperature, for instance, on the inner and outer walls, respectively, of a room, or in different rooms of a centrally heated building. The number of interconnected capacitors such as 52, 53 may be increased to any desired extent and they may be connected in parallel or in series or in series-parallel. For regulating the temperature of a room the temperature-sensitive dielectric of said capacitors is chosen to have a Curie point, or temperature of maximum dielectric constant, at a "comfortable" temperature which is warm enough during winter and is yet cool enough in the summer, such for intsance as a temperature of approximately 75 degrees Fahrenheit, which corresponds with the Curie point of unconstrained Rochelle salt. The inductance of the reactor 61 is then chosen so that when the temperature is close to the Curie point, for instance 72 degrees Fahrenheit in winter or 78 degrees Fahrenheit in summer, and when the thermally sensitive capacitors are therefore close to their maximum capacitance, the phase angle of the output voltage 73'—60' of the thermal regulator 51 is sufficiently retarded that, after it has passed through the RC network 79—82 to the grid and cathode of tube 76, the output from the anode 87 and hence from the electric power controller 75 to the motor 96—97 is so low that the motor will not run; under these conditions there is a minimum flow of heat through the heat energy controller 92.

The thermostat 102 is also adjusted to selectively open the valve 100 (and close the valve 101) and so connect the heating source 98 to the heating coil 93 at all temperatures below the approximate Curie point, while at all temperatures above the approximate Curie point it selectively opens the valve 101 (and closes valve 100) and so connects the cooling source 99 to the cooling coil 94.

When the room temperature is, for instance, 72 degrees Fahrenheit, the heating coil 93 is connected to heating source 98 but the motor 96—97 and fan 95 are stationary so that there is substantially no flow of heat into the room. If the room temperature now decreases to, say 71 degrees Fahrenheit, the capacitance of the thermally sensitive capacitors 52, 53 will decrease as shown in the section of the curve c—a in FIGURE 1 and this will lengthen the capacitive voltage vector $E_c$ in FIGURE 5 and so advance the phase of the output voltage 73'—60' of the thermal regulator, thus causing the tube 76 to deliver unidirectional current to the motor 96—97 which thereupon drives the fan 95 and creates a flow of air past the heating coil 93. This establishes a flow of heat into the room at a rate depending upon the rate of flow of air, and hence upon the fan and motor speed. Since the temperature-sensitive capacitors are located in the room, the speed of the motor and hence the flow of heat will be continuously modulated to maintain a substantially constant room temperature. It will be seen from FIGURE 1 that a small change in temperature causes a large change in capacitance. It will also be seen from FIGURE 5 that a small change in the length of the capacitive voltage vector $E_c$ in relation to the inductive vector $E_{61}$ causes a large change in phase angle of the output vector 73'—60' and accordingly the entire system is extremely sensitive, and I have found it possible to maintain a temperature constancy of the order of 1 degree Fahrenheit with comparatively simple apparatus.

During hot weather, if the room temperature reaches, for example, 78 degrees Fahrenheit, the thermostat 102 will have disconnected the heating coil 93 and will have connected the cooling coil 94 to the cold source 99; under the conditions hereinbefore described, however, the phase of the thermal regulator output voltage will be so much retarded that the motor and fan will not run, and there will be substantially no flow of heat. If the temperature should rise to say 79 degrees Fahrenheit, the capacitance of the temperature-sensitive capacitors 52, 53 will decrease as shown by the section c—b of the curve in FIGURE 1 and the phase of the thermal regulator output voltage will be advanced so that the tube 76 delivers power to the motor 96—97, thus driving the fan and forcing air through the cooling coils. Thus, a flow of heat is created between the air and the cooling coils and the room is thereby cooled and its temperature maintained substantially constant by continuous modulation of the rate of air flow and therefore of heat flow.

To allow for individual tastes in the degree of heating and cooling required, and to compensate for various conditions of rooms and of wiring, etc., three adjustment means are provided in FIGURE 4 for selecting the relation between the motor speed and the amount by which the temperature differs from the Curie point. The first such means comprises switch 54 which may select an additional capacitor 55, 56 or 57 to reduce the motor speed by steps, as desired, so that the regulated temperature is further from the Curie point as said capacitance is increased. The second such means comprises the variable condenser 82 in conjunction with resistor 79. By increasing condenser 82 the phase of the "thyratron" grid voltage may be slightly retarded, and the motor speed somewhat reduced, thus affording a fine continuous control of the temperature to be regulated. I have also found it possible to adjust the phase angle and accordingly the operating temperature, when using a dielectric of Rochelle salt, by adjusting the alternating current input voltage to the thermal regulator, as indicated by the adjustable tapping 107 on the primary 65 of the input transformer for the thermal regulator.

The system described with reference to FIGURE 4 operates with a "normal" sense of control, as hereinbefore defined, inasmuch as the flow of heat is increased when the temperature varies away from the Curie point. FIGURE 4 embodies a phase shifter having a "normal" sense of control, inasmuch as a decrease in capacitance advances the phase of the output voltage. The electric power controller 75 of FIGURE 4 may also be said to have a "normal" sense of control, inasmuch as its output increases when the phase of the control voltage is advanced. Furthermore, the heat energy controller 92 may also be said to have a "normal" sense of control, since the heat flow is increased when its electrical input is increased.

Figure 6:
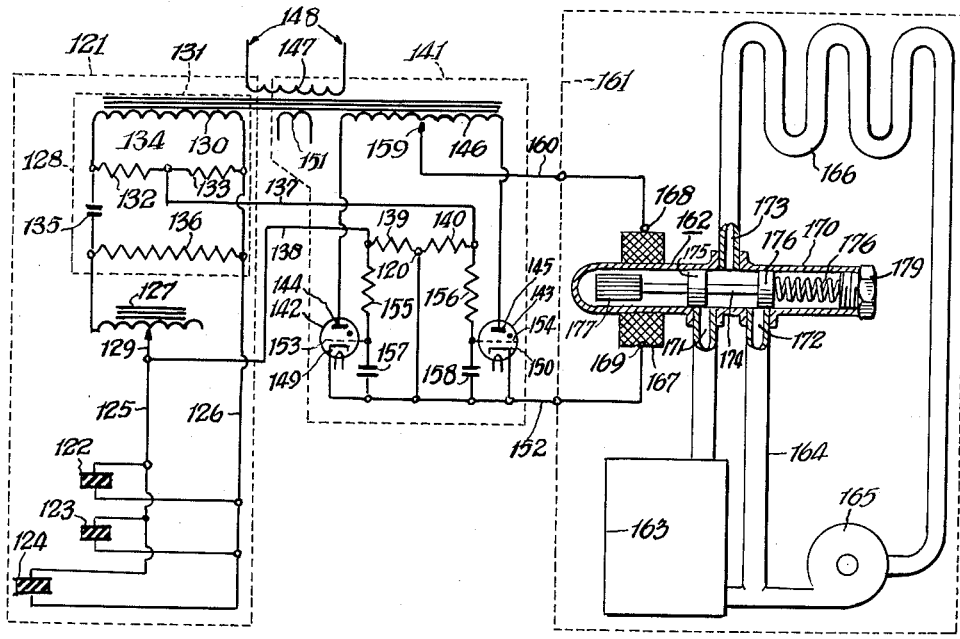
FIGURE 6 is another modification of a heat governing system which has an inverted sense of operation.

FIGURE 6 illustrates a system having an "inverted" sense of control, which is obtained by designing the heat energy controller to have an "inverted" sense of operation, while the phase shifter and the electric power controller each have a "normal" sense. The thermal regulator 121 comprises a plurality of temperature sensitive capacitors 122, 123, 124 (though a single such capacitor may be used if desired), which are connected in parallel with each other and to conductors 125, 126, which group of capacitors is connected in series with reactor 127 to alternating current input means 128. An adjustable tap 129 is provided on reactor 127 for the purpose of adjusting the desired operating temperature and to allow for the preferred number of temperature-sensitive capacitors in each installation. The alternating current input means 128 comprises the secondary 130 of transformer 131, across which the equal resistors 132, 133 are serially connected through an output terminal 134. A fixed capacitor 135 and resistor 136 are also serially connected across transformer secondary 130, and the circuit comprising reactor 127 and temperature-sensitive capacitors 122, 123, 124 is connected across said resistor 136. It will be seen that the thermal regulator 121 comprises a temperature-sensitive phase shifter similar in principle to that illustrated in FIGURE 4, and its vector diagram is similar to that of FIGURE 5, with appropriate changes to the numerals.

The output of thermal regulator 121 is taken from terminal 134 and from tap 129 through conductors 137 and 138 to the opposite ends of serially connected resistors 139, 140 which form the control circuit for an electric power controller 141. Said electric power controller comprises grid-controlled rectifier tubes 142, 143 having anodes 144, 145 energized from the secondary 146 of transformer 131, of which the primary 147 is arranged for connection to an alternating current source 148. The cathodes 149, 150 of tubes 142, 143 are heated by filaments connected to transformer secondary 151, which connections are omitted for simplicity from FIGURE 6. The cathodes are connected to an output conductor 152. The alternating current control voltage across resistors 139 and 140 is applied to grids 153, 154 of tubes 142, 143 through series resistors 155, 156, also capacitors 157, 158 are connected from grids 153, 154, respectively, to conductor 152. The common point 120 of resistors 139 and 140 is also connected to conductor 152. The output of the electric power controller 141 is taken from center tap 159 on transformer secondary 146 to a conductor 160, and from conductor 152 which is connected to cathodes 149, 150.

A heat energy controller 161 comprises a solenoid-operated valve 162, a hot water "boiler" 163, a by-pass 164, a circulating pump 165, and radiation or convection piping and/or radiators 166 located in a building which it is desired to heat. The valve 162 is provided with an electrically operated solenoid 167 which is connected through terminals 168, 169 to conductors 160 and 152. The valve also comprises a body 170 having alternative inlet ports 171, 172, and an outlet port 173. A slidable plunger 174 is provided with piston portions 175, 176, and with an armature portion 177. The armature comprises a magnetic material while the remaining valve parts are preferably non-magnetic. A spring 178 is compressed by an end cap 179 so as to force the plunger 174 to the left, thus opening port 171 and closing port 172, in the absence of any electrical input at terminals 168, 169. Under these conditions, hot water from boiler 163 is forced by circulating pump 165 through piping 166 and heat is transferred to the building at the maximum rate. When electrical energy is supplied to terminals 168, 169, however, the armature 177 is pulled towards the right, thus progressively closing port 171 and opening port 172 as the electrical input is increased, and accordingly permitting an increasing percentage of the water to flow through by-pass 164 instead of through boiler 163, and thus reducing the rate of heat transfer to the building.

In the operation of the entire system, one or more of the temperature-sensitive capacitors 122, 123 are located within the building of which it is desired to control the temperature, and their Curie point is chosen to be below the lowest desired temperature. As the temperature within the building rises, the capacitance of said temperature-sensitive capacitors decreases, thus advancing the phase of the voltage applied to grids 153, 154 of electric power controller 141 and increasing its output to conductors 160, 162. Accordingly the solenoid 167 is energized to an increasing extent, thus moving plunger 174 of valve 162 to the right, and by-passing the flow of water so as to reduce the rate of heat transfer to the building until such time as the temperature reaches a stable value at which the temperature-sensitive capacitors provide the appropriate phase shift to give the necessary rate of heat flow.

It will be seen that this system has an "inverted" sense of control, inasmuch as the flow of heat decreases when the temperature varies away from the Curie point.

If it is desired to compensate for variations in outdoor temperature one of the thermally sensitive capacitors 124 may be mounted outdoors, providing its capacitance is suitably low compared with the total capacitance of those which are mounted indoors. Its Curie point should be chosen to be below the minimum expected outdoor temperature so that it operates in the same "inverted" sense as the indoor capacitors.

The adjustable tapping 129 on reactor 127 provides a means for adjusting the desired operating temperature by changing the inductance of 127 so that a different capacitance, and therefore a different temperature, is required to produce a given phase angle at the output conductors 137, 138 of the thermal regulator 121.

Figure 7:
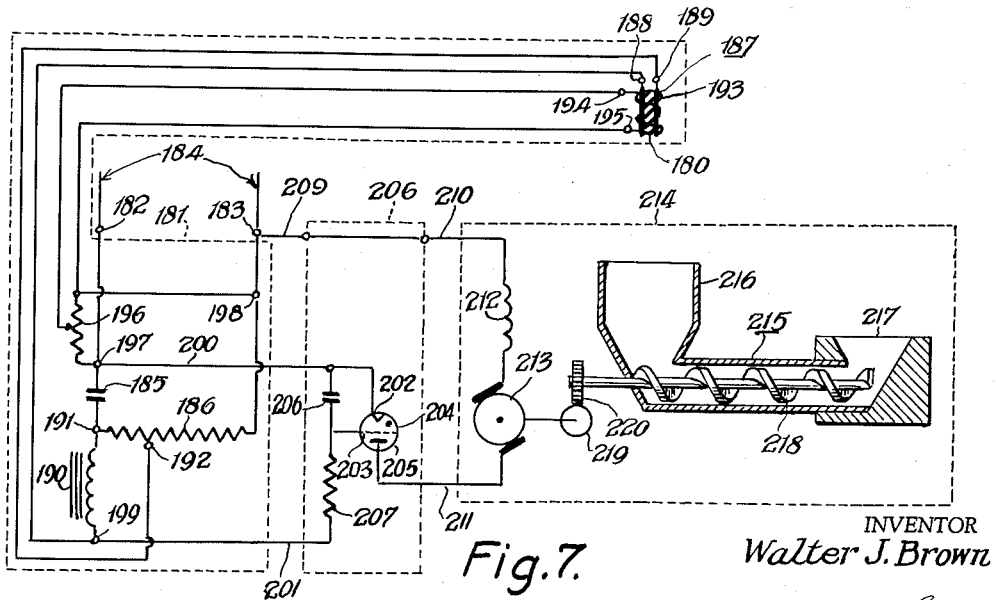
FIGURE 7 is a still further modification of a heat governing system which also has an inverted sense of operation.

FIGURE 7 illustrates a system in which an "inverted" sense of control is obtained by means of a special phase-shifting network having an inverted sense, together with an electrical power controller and a heat energy controller each having a "normal" sense of control. The thermal regulator 181 is provided with input terminals 182, 183 for connection to an alternating current source 184. A capacitor 185 and a resistor 186 are serially connected between input terminals 182, 183. A temperature-sensitive capacitor 187 is provided with a temperature-sensitive dielectric 180 and with two electrodes connected to terminals 188, 189 which are connected in series with reactor 190 across a portion of resistor 186 between an end terminal 191 and a tap 192. The temperature-sensitive capacitor 187 is also provided with a heater winding 193 connected to terminals 194, 195 which are in turn connected across an adjustable portion of a resistor or transformer 196 which is connected to a suitable current source at 197, 198.

Figure 8:
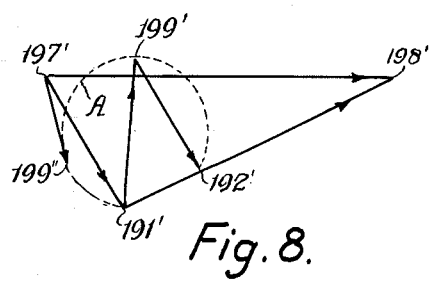
FIGURE 8 is a vector diagram of the voltage vectors obtainable from the phase-shifting network used in the thermal regulator of FIGURE 7.

The elements 185, 186, 187, 190 comprise a phase-shifting network having an "inverse" sense of operation inasmuch as a decrease in capacitance of 187 will retard the phase angle of the voltage appearing at the output terminals 199 and 197 as will be seen from the vector diagram reproduced in FIGURE 8.

Referring to FIGURE 8, the vector 197′—198′ represents the input voltage from the alternating current source. Vector 197′—191′ represents the voltage across capacitor 185 and a vector 191′—198′ represents the voltage across resistance 186, on which 192′ represents the potential of tapping point 192. The vector 191′—192′ represents a reference voltage, across which reactor 190 and temperature-sensitive capacitor 187 are serially connected. Vectors 191′—199′ and 199′—192′ represent the voltages across reactor 190 and temperature-sensitive capacitor 187, respectively, as they exist when the capacitance of 187 is high, corresponding to a temperature approaching the Curie point. As the temperature moves away from the Curie point, the capacitance of 187 decreases, resulting in a lengthening of the capacitive voltage vector 199′—192′ in relation to the inductive vector 191′—199′ and the point 199′ then moves counterclockwise round an arc such as the arc "A" shown in dotted lines, which spans the reference voltage vector 191′—192′, to a new point such as 199″. The output voltage is taken between the variable point indicated by 199′ or 199″, and the fixed point 197′ and since the point 197′ is outside the arc "A" it will be seen that when point 199′ moves counterclockwise around the arc, the output vector 197′—199′ moves clockwise. Accordingly, the phase shifter operates in an "inverse" sense and a decrease in capacitance causes a clockwise rotation of the output vector corresponding to a retardation in phase angle.

Continuing the description of FIGURE 7, the output terminals 197 and 199 of the thermal regulator 181 are connected through conductors 200, 201 to the cathode 202 and grid 203 of the space discharge device 204, which also has an anode 205 and which acts as the electric power controller 206.

A resistor 207 and a capacitor 208 are provided in the grid circuit to by-pass unwanted transients. The device 204 is filled with suitable gas or vapor and the cathode 202 may be heated by a filament, not shown, or it may be a cold cathode with means, not shown, for establishing and maintaining a space discharge from the cathode. Conductors 200 and 209 act as input leads to electric power controller 206, while conductors 210, 211 act as output leads which are connected to the series field 212 and armature 213 of a motor forming part of the heat energy controller 214. Said heat energy controller comprises a mechanical stoker 215 which includes a fuel hopper 216, a tuyere or burner 217, and an Archimedean screw feed 218 which is driven from motor armature 213 and gearing 219, 220. A heating furnace is installed above the tuyere 217, together with means for distributing its heat output to a building, these elements being omitted for simplicity, but the temperature-sensitive capacitor 187 is installed within said building for the purpose of regulating its temperature.

The dielectric 180 of said temperature-sensitive capacitor 187 has a Curie point which may be at the approximate temperature which it is required to control, such as Rochelle salt, having a Curie point at about 75 degrees Fahrenheit. The heating resistor 193 is arranged to raise the temperature of the dielectric 180 of capacitor 187 to a temperature somewhat above the desired room temperature, and the constants of the reactor 190 and of the remaining components of thermal regulator 181 are adjusted so that when the room temperature is at the desired value and the dielectric 180 is at a temperature conveniently above the Curie point, such as 80 degrees or 85 degrees Fahrenheit, the motor armature 213 is running at a speed sufficient to feed the required amount of fuel to the furnace. Any increase in room temperature will then decrease the capacitance of 187, thus retarding the phase of the output voltage from thermal regulator 181, so reducing the output of electric power controller 206 and slowing down the motor armature 213 and reducing the rate of fuel supply to the tuyere 217, and vice versa.

In order to reduce the desired temperature of the building, the potentiometer or transformer 196 is adjusted to deliver more current to heater 193, thus increasing the difference between the room temperature and the temperature at which the dielectric 180 is automatically and constantly maintained, thus depressing the room temperature, and vice versa.

Figure 9:
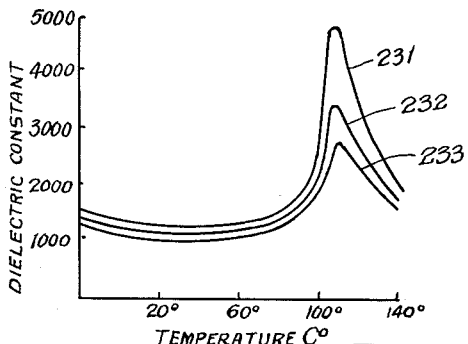
FIGURE 9 is a graph of dielectric constant versus temperature of a temperature-sensitive dielectric and showing a family of curves obtained by varying a superimposed direct current voltage on the dielectric.
Figure 10:
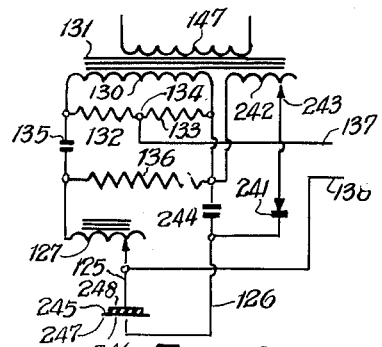
FIGURE 10 is a modification of a thermal regulator, such as that used with FIGURE 6.

Another method of controlling the desired temperature is illustrated in FIGURES 9 and 10. FIGURE 9 is reproduced from "The Journal of the Institution of Electrical Engineers," volume 93, Part I, No. 72, December 1946, page 595, Figure A, and this shows the variation of dielectric constant of a barium-strontium titanate versus temperature when a direct current voltage gradient is superimposed on the dielectric. It will be seen that the temperature at which a given dielectric constant is obtained may be altered by superimposing direct current voltage gradients of different values. For instance, curve 231 shows the variation of dielectric constant versus temperature when no direct current voltage gradient is applied. Curve 232 shows such variation when a direct current voltage gradient of 5000 volts per centimeter is applied. Curve 233 shows such variation when a direct current voltage gradient of 10,000 volts per centimeter is applied. It will be seen that a dielectric constant of 2500 is obtained at approximately 96 degrees centigrade for curve 231, 100 degrees centigrade for curve 232 and 104 degrees centigrade for curve 233.

FIGURE 10 shows a modification to the circuit shown in FIGURE 6 in which a direct current voltage is applied to the temperature-sensitive capacitor 246 by means of a direct current source shown diagrammatically as a rectifier 241 which is supplied with alternating current from a transformer secondary 242 having an adjustable tapping 243, and which delivers a unidirectional current to the large capacitor 244. A direct current voltage is accordingly developed across capacitor 244 and is applied, through resistor 136 and reactor 127 to conductors 125, 126 and thence to a temperature-sensitive capacitor 246. Accordingly the direct current voltage gradient in the temperature-sensitive dielectric 245 may be adjusted by means of the adjustable tapping 243 so as to vary the temperature at which a given dielectric constant is obtained, and thus to vary the temperature which it is desired to control. The dielectric 245 is preferably very thin so that the direct current voltage required is not excessively high and said dielectric may take the form, for instance, of a ceramic coating applied to an electrode 247 and/or an electrode 248.

Figure 11:
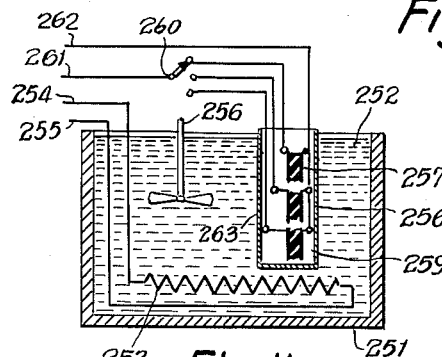
FIGURE 11 is a modification of the heat energy controller wherein a plurality of temperature-sensitive capacitors may be used to control the temperature of a liquid bath.

FIGURE 11 shows an alternative form of heat energy controller in which heat is created by the electrical output from the electric power converter or controller. The vessel 251 contains a liquid 252 which is heated by an energy-delivering device in the form of an electrical heating resistor 253 which is connected through conductors 254, 255 to the output of an electric power converter or controller, such as that shown in FIGURES 4, 6 or 7. The mechanical stirrer 256 is provided to improve the uniformity of heating of the liquid. Temperature-sensitive capacitors 257, 258 and 259 have been provided, any one of which may be selected by a switch 260 and connected to conductors 261 and 262 so as to form a part of a thermal regulator such, for instance, as that shown in FIGURE 4 in which case conductors 261 and 262 replace conductors 58 and 59 of FIGURE 4, or such as that shown in FIGURE 6 or FIGURE 7. A protective shield or casing 263 is preferably provided to protect the temperature-sensitive capacitors from the liquid 252. The temperature of the liquid 252 is continuously controlled by the variation in capacitance of whichever temperature-sensitive capacitor is selected by switch 260 and the system automatically maintains a substantially constant desired temperature. The desired temperature value may be varied over a given range by the various means described in reference to FIGURES 4, 6, 7 or 10. The desired temperature may be further adjusted by arranging the temperature-sensitive capacitors 257, 258, 259 to have different Curie points and/or different capacitances, any one of which may be selected by switch 260.

Figure 12:
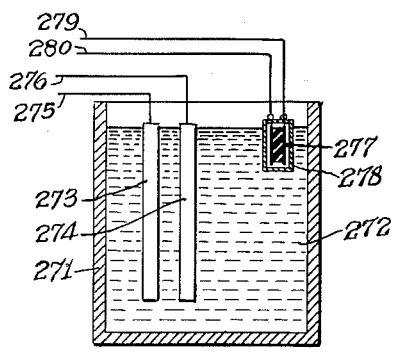
FIGURES 12 and 13 are modification of heat energy controllers wherein heat is produced as an unwanted by-product and a temperature-sensitive capacitor is used to limit the maximum permissible temperature.

FIGURE 12 shows a heat energy controller of a form in which heat is created as an unwanted by-product, and it is desired to control the temperature rise resulting therefrom. The vessel 271 may, for instance, comprise the casing of a storage battery or an electrolytic cell containing a liquid electrolyte 272 in which plates or electrodes 273 and 274 are immersed, and are connected by conductors 275 and 276 to the output of an electric power controller such as is shown in FIGURES 4, 6 or 7. A temperature-sensitive capacitor 277 which is provided with a protective coating or casing 278 is also immersed in the liquid 272 and is connected by conductors 279, 280 to circuits, such as those shown in FIGURES 4, 6, or 7 to constitute a complete thermal regulator. Accordingly if the temperature of the liquid 272 exceeds a desired value the output of the electric power converter or controller is progressively reduced by the action of the thermal regulator so as to limit the temperature rise.

Figure 13:
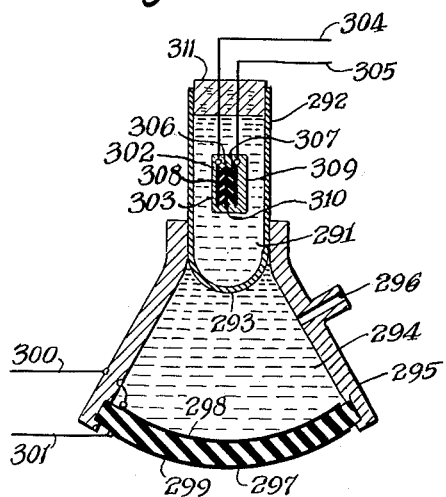

FIGURE 13 illustrates another form of heat energy controller in which heat is created as an unwanted by-product in the treatment of a material by ultrasonic energy. A liquid 291 to be treated ultrasonically is contained in a vessel 292 and ultrasonic energy is transmitted to the liquid through the wall 293 of vessel 292 from the second liquid 294 which is contained within the vessel 295 and which is maintained at high pressure by a pump connected to the port 296. Ultrasonic energy is developed in liquid 294 by means of the ultrasonic transducer 297 which may comprise, for instance, a piezoelectric or magnetostriction vibrator having electrodes or terminals 298, 299 which are energized by a high frequency current supplied through conductors 300 and 301 from an electric power converter or controller, such as shown by the block 33 in FIGURE 3. In this instance, however, the electric power converter or controller is designed to deliver a high frequency alternating current instead of a unidirectional current.

Temperature-sensitive capacitor 302 which may be provided with a protective coating or casing 303 is connected by conductors 304 and 305 to circuits, such as those shown in FIGURES 4, 6 and 7, to constitute a complete thermal regulator for controlling the output of the electric power converter or controller, and thereby controlling the electrical power input to the transducer 297 so that said power output is progressively reduced after a desired limiting temperature has been reached; in this way for instance the maximum amount of ultrasonic energy may be propagated through the liquid 291 without reaching its boiling point.

Since the temperature-sensitive capacitor 302 will be subjected to ultrasonic bombardment, an unwanted high frequency voltage may be developed due to piezoelectric effect in its dielectric. Accordingly, the dielectric is preferably made in the form of a "sandwich" comprising two layers of dielectric material 306 and 307, which are of equal thickness but which are so prepared and oriented that equal and opposite high frequency voltages will be developed in each layer so that the total high frequency voltage appearing across the two layers in series approximates to zero. Electrodes 308 and 309 are provided at the outer faces of each layer and are connected to the conductors 305 and 304, and an additional common electrode or pair of adjacent contacting electrodes 310 may be provided between the two layers. A closure 311 is preferably provided at the top of vessel 292 to prevent escape of the liquid 291 while under bombardment.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A system for charging a storage battery at a rate which is limited by the safe battery temperature comprising: a phase-sensitive controlled rectifier provided with alternating current input means and direct current output terminal means for connection to said battery, and at least two phase-sensitive control terminals; a temperature-sensitive phase-shifting device comprising an input network energized from said alternating current input means, at least one capacitor having a temperature-sensitive ferroelectric dielectric and adapted to be placed in heat-receiving relationship with said battery, an inductance serially connected with said capacitor across said input network with a first output terminal operatively connected between said capacitor and said impedance, and a second output terminal connected to a point on said input network; and connections from the output terminals of said phase-shifting device to said control terminals.

2. A system as set forth in claim 1, in which the capacitor having the temperature-sensitive dielectric is immersed in the electrolyte of said storage battery.

3. A system as set forth in claim 2, in which the capacitor is provided with a protective shield adapted to be at least partially immersed in said electrolyte.

4. A system for regulating the temperature of an electrolyte fluid, comprising an electrode means immersed in said electrolyte fluid; a phase-sensitive electric power converter for supplying variable electric power to said electrode means; alternating current input means; a temperature-sensitive passive phase-shifting network including at least one capacitor having a temperature-sensitive ferroelectric dielectric and an inductive element in series with said capacitor, said capacitor being disposed in said fluid and connected to said input means for delivering a continuously maintained output, the phase angle of which is continuously variable in accordance with the capacitance of said capacitor; said phase-sensitive converter being connected to the output of said network, said input means, said converter and said electrode means being operatively intercoupled whereby the flow of electric power to said electrode means is continuously controlled by the temperature of said temperature-sensitive capacitor.

5. A system as set forth in claim 4, in which the temperature-sensitive capacitor is located within a protective shield and immersed in the electrolyte.

6. A system for regulating the temperature of a storage battery electrolyte, comprising electrode plates of a storage battery disposed in said storage battery electrolyte; a phase-sensitive electric power converter for supplying variable electric power to said plates; alternating current input means; a temperature-sensitive passive phase-shifting network including at least one capacitor having a temperature-sensitive ferroelectric dielectric and an inductive element in series with said capacitor, said capacitor being disposed in said fluid and connected to said input means for delivering a continuously maintained output, the phase angle of which is continuously variable in accordance with the capacitance of said capacitor; said phase-sensitive converter being connected to the output of said network, said input means, said converter and said plates being operatively intercoupled whereby the flow of electric power to said plates is continuously controlled by the temperature of said temperature-sensitive capacitor.

7. A system for regulating the temperature of a fluid, comprising a device adapted to generating energy in a predetermined non-thermal form as well as in the form of undesired thermal energy deposited in said fluid; a phase-sensitive electric power converter to said device; alternating current input means; a temperature-sensitive passive phase-shifting network including at least one capacitor having a temperature-sensitive ferro-electric dielectric and an inductive element in series with said capacitor, said capacitor being disposed in said fluid and connected to said input means for delivering a continuously maintained output, the phase angle of which is continuously variable in accordance with the capacitance of said capacitor; said phase-sensitive converter being connected to the output of said network, said input means, said converter and said device being operatively intercoupled whereby the flow of electric power to said device is continuously controlled by the temperature of said temperature-sensitive capacitor, and the system operates to limit the maximum temperature of the fluid.

References Cited in the file of this patent

UNITED STATES PATENTS

| | | |
|---|---|---|
| 2,017,859 | Halstead | Oct. 22, 1935 |
| 2,498,814 | Little et al. | Feb. 28, 1950 |
| 2,505,565 | Michel et al. | Apr. 25, 1950 |
| 2,568,435 | Downey | Sept. 18, 1951 |
| 2,673,917 | Woodling | Mar. 30, 1954 |
| 2,842,345 | Brown | July 8, 1958 |
| 2,887,646 | Gilchrist | May 19, 1959 |
| 2,898,543 | Roper et al. | Aug. 4, 1959 |